US010452657B2

(12) United States Patent
Gerard

(10) Patent No.: US 10,452,657 B2
(45) Date of Patent: *Oct. 22, 2019

(54) REUSING SUB-QUERY EVALUATION RESULTS IN EVALUATING QUERY FOR DATA ITEM HAVING MULTIPLE REPRESENTATIONS IN GRAPH

(71) Applicant: International Business Machines Corporation, Armonk, NY (US)

(72) Inventor: Scott N. Gerard, Wake Forest, NC (US)

(73) Assignee: International Business Machines Corporation, Armonk, NY (US)

(*) Notice: Subject to any disclaimer, the term of this patent is extended or adjusted under 35 U.S.C. 154(b) by 499 days.

This patent is subject to a terminal disclaimer.

(21) Appl. No.: 15/278,669

(22) Filed: Sep. 28, 2016

(65) Prior Publication Data

US 2018/0089265 A1 Mar. 29, 2018

(51) Int. Cl.
G06F 16/20 (2019.01)
G06F 16/2453 (2019.01)

(52) U.S. Cl.
CPC .... G06F 16/24535 (2019.01); G06F 16/2453 (2019.01); G06F 16/24545 (2019.01)

(58) Field of Classification Search
None
See application file for complete search history.

(56) References Cited

U.S. PATENT DOCUMENTS

| 6,151,595 A | 11/2000 | Pirolli et al. |
| 8,706,653 B2 | 4/2014 | Kasneci et al. |
| 8,898,159 B2 | 11/2014 | Brown et al. |
| 2008/0281801 A1 | 11/2008 | Larson et al. |
| 2012/0066205 A1 | 3/2012 | Chappell et al. |
| 2013/0257871 A1 | 10/2013 | Goldstein et al. |
| 2014/0153366 A1* | 6/2014 | Nealon ............... G01V 1/301 367/73 |
| 2014/0351281 A1 | 11/2014 | Tunstall-Pedoe |
| 2015/0058412 A1 | 2/2015 | Hillerbrand |
| 2015/0331850 A1 | 11/2015 | Ramish |
| 2016/0147834 A1 | 5/2016 | Lee et al. |
| 2017/0068748 A1 | 3/2017 | Hu et al. |
| 2017/0177303 A1 | 6/2017 | Ma et al. |
| 2017/0177664 A1 | 6/2017 | Ma et al. |

(Continued)

OTHER PUBLICATIONS

Oracle Spatial and Graph: RDF Semantic Graph Feature presentation, 2013, 250 pp.

(Continued)

Primary Examiner — Jau Shya Meng
(74) Attorney, Agent, or Firm — Ewa M. Wozniak

(57) ABSTRACT

Sub-queries for a query are determined. The query is for retrieving a data item of a data graph. The data graph stores representations of the data item. Each representation of the data item stores knowledge represented by the data item in a different way or manner. Each sub-query corresponds to a different representation by which the data graph stores the data item. The sub-queries are evaluated to determine an appropriate representation of the data item in fulfillment of the query without duplicatively traversing the data graph, such as by reusing evaluation results of the sub-queries that overlap one another.

16 Claims, 9 Drawing Sheets

(56) References Cited

U.S. PATENT DOCUMENTS

| | | |
|---|---|---|
| 2017/0177666 A1 | 6/2017 | Ma et al. |
| 2018/0089263 A1 | 3/2018 | Gerard |
| 2018/0089264 A1 | 3/2018 | Gerard |

OTHER PUBLICATIONS

"Reconciliation", online <https://web.archive.org/web/20141030044042/http://wiki.freebase>, Oct. 16, 2012, 3 pp.

List of IBM Patents or Patent Applications to Treat As Related.

\* cited by examiner

US 10,452,657 B2

REUSING SUB-QUERY EVALUATION RESULTS IN EVALUATING QUERY FOR DATA ITEM HAVING MULTIPLE REPRESENTATIONS IN GRAPH

BACKGROUND

Data is commonly stored in computing systems for later retrieval. Such retrieval can be performed by querying a data store for a desired data item that may be stored in the data store. Data may be stored within a computing system as a data graph. A data graph includes a number of nodes, which are connected to one another via edges. Data can be stored within each node, as well as on each edge.

SUMMARY

An example method includes receiving, by a computing device, a query for retrieving a data item of a data graph. The data graph stores representations of the data item. Each representation of the data item stores knowledge represented by the data item in a different manner. The method includes determining, by the computing device, sub-queries for the query. Each sub-query corresponds to a different representation by which the data graph stores the data item. The method includes evaluating, by the computing device, the sub-queries of the query to determine an appropriate representation of the data item in fulfillment of the query, including reusing evaluation results of the sub-queries that overlap one another.

An example computer program product includes a computer-readable storage medium having program instructions embodied therewith. The computer-readable storage medium is not a transitory signal per se. The program instructions are executed by a computing device to determine sub-queries for a query. The query is for retrieving a data item of a data graph. The data graph stores representations of the data item. Each representation of the data item stores knowledge represented by the data item in a different way. Each sub-query corresponds to a different representation by which the data graph stores the data item. The program instructions are executed by the computing device to evaluate the sub-queries to determine an appropriate representation of the data item in fulfillment of the query without duplicatively traversing the data graph.

An example system includes network hardware to communicatively connect to a network over which a query for retrieving a data item of a data graph is received. The system includes a storage device to store the data graph. The data graph has nodes interconnected by edges. The data graph includes representations of the data item. Each representation represents the data item in a different way. Each representation corresponds to a different node or edge of the data graph. The system includes logic including hardware, to select an appropriate representation of the data item in satisfaction of the query by evaluating a plurality of sub-queries for the query without duplicatively traversing any node or edge of the data graph. Each sub-query corresponds to a different representation by which the data graph stores the data item.

BRIEF DESCRIPTION OF THE DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Figure 1:
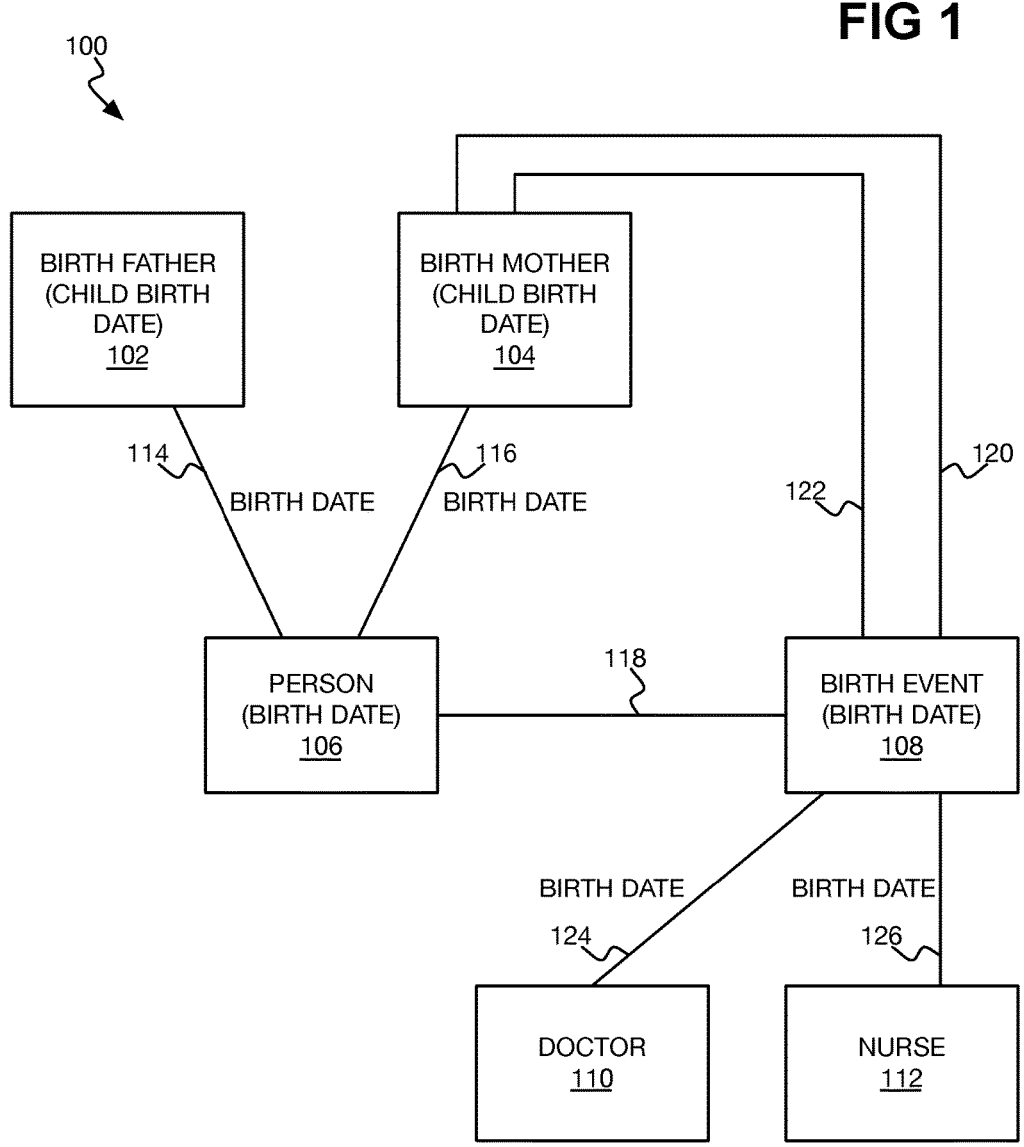
FIG. 1 is a diagram of an example data graph.

As noted in the background section, a computing system can store retrievable data as a data graph including nodes that are interconnected to one another by edges. Traditionally, data has been stored canonically. This means that for any piece of information, there is a single, unambiguous manner by which the information is canonically represented within a data graph. Before new data is added to the data graph, the data is "cleaned" to ensure that any ambiguity in the information or knowledge to which the data corresponds is removed.

However, more recently data has begun to be stored cognitively to better reflect the ambiguous nature of information. This means that for a piece of information, there can be multiple ways in which the information can be represented within a data graph. Each representation of the data may convey the information in a different way, and no particular way may be considered the "right" or "correct" way in an absolute sense. Data can be added to the data graph without having to remove any ambiguity in the information or knowledge to which the data corresponds.

As one example, a person's date of birth is not necessarily devoid of ambiguity. A woman may enter a hospital to give birth on December 30, begin labor on December 31, and give birth on January 1 to a child. While January 1 may be commonly considered the date of birth of the child, in other circumstances December 30 or December 31 may be considered the birth date. The hospital may track birth dates by when expectant mothers enter the hospital, in which case December 30 is the birth date. Certain inheritance and tax methodologies may permit December 31 to be listed as the birth date. Therefore, there is ambiguity within the birth date. Neither December 30, December 31, nor January 1 is the "wrong" birth date in an absolute sense. Rather, each of these dates is the "right" birth date depending on the context in question.

Storing multiple representations of a data item is thus useful in a cognitive sense, because different representations of the data item may be appropriate for different contexts, and therefore satisfying different queries for the same data item. A query requesting a person's birth date for tax or inheritance purposes may solicit a different representation of the same data item as compared to a query requesting the same person's birth for more conventional purposes. Reflecting the ambiguous nature of information by storing multiple representations of a data item permits fulfillment of cognitively diverse queries for the same data item but that may be soliciting different representations of the item.

Disclosed herein are techniques for evaluating a query for a data item that has multiple representations in a data graph. Multiple sub-queries for the query are determined, where each sub-query corresponds to a different representation by which the data graph stores the data. Each representation of the data item within the data graph corresponds to a different way or manner by which the knowledge or information represented by the data item is stored. The sub-queries for the query are evaluated to determine an appropriate representation of the data item for the query in question. Evaluation of the sub-queries includes reusing evaluation results of the sub-queries that overlap one another. Therefore, the appropriate representation of the data item can be determined to fulfill the query without duplicatively traversing the data graph.

Such techniques can provide for improved performance in retrieving a representation of a data item in apparent fulfillment of the query. The data graph can include nodes interconnected by edges. Each representation of the data item may correspond to a different node or edge of the graph. Each sub-query can have a traversal path through the graph to the node or edge corresponding to the representation of the data item of the sub-query. When a sub-query is evaluated, the representations of the nodes and edges of the sub-query's evaluation path are retrieved, and can be stored as evaluation results. By reusing the evaluation results of already evaluated sub-queries, duplicate retrieval of the nodes and edges of the graph that have already been retrieved is avoided, decreasing the number of times that the graph has to be queried to obtain a node or an edge thereof (i.e., to obtain the representation stored in that node or edge). A composite traversal path may be constructed as each sub-query is generated to provide for such reuse.

FIG. 1 shows an example data graph 100 that cognitively stores information over nodes 102, 104, 106, 108, 110, and 112 that are interconnected to one another by edges 114, 116, 118, 120, 122, 124, and 126. The data graph 100 cognitively stores information in that the graph 100 stores multiple representations of a data item, such as the birth date of the person identified by the node 106, which each store a different cognition of this knowledge that the data item represents in a different way or manner. In the example of FIG. 1, the edges 114, 116, 118, 120, 124, and 126 are non-directional, but in another implementation, one or more edges interconnecting nodes like the nodes 102, 104, 106, 108, 110, and 112 can be directional. A directional edge connects a source or "from" node to a destination or "to" node, and the direction of the edge can itself indicate information.

The nodes 102 and 104 correspond to the birth father and the birth mother, respectively, of the person of the node 106. Each of the nodes 102 and 104 may store the birth date of the person of the node 106. The node 102 may store Dec. 31, 1964 as the date of the person of the node 106, whereas the node 104 may store Jan. 1, 1965. Dec. 31, 1964, may be the date of the person for tax purposes, whereas Jan. 1, 1965 may be the medical date of birth of the person. The node 106 may store Jan. 1, 1965, which is the date that the person of the node 106 identifies as his or her birth date.

The edges 114 and 116 connect the node 102 and 104, respectively, to the node 106. Each of the edges 114 and 116 may also store the birth date of the person of the node 106. The edge 114 may store Dec. 31, 1964 as the date of the person of the node 106, for inheritance purposes. The edge 116 may store Jan. 2, 1964 as the date of the person of the node 106, as the date when the birth mother left the hospital after giving birth.

The node 108 is an event node that corresponds to the birth event of the person of the node 106. The node 108 is therefore connected to the node 106 by an edge 118. The nodes 102 and 104 of the birth father and the birth mother are likewise connected to the node 108 by edges 120 and 122, respectively. The edges 118, 120, and 122 may not contain any information regarding the birth date of the person of the node 106. The node 108 may store Jan. 1, 1965, which is the date of the actual birth of the person of the node 106 as recorded at the hospital.

The node 110 corresponds to the doctor that performed delivery of the person of the node 106 at the hospital, and the node 112 corresponds to the attending nurse that assist the delivery of the person of the node 106 at the hospital. The nodes 110 and 112 are thus connected to the node 108 by edges 124 and 126, respectively. The edge 124 may store Dec. 31, 1964 as the date of the person of the node 106, as the date when the doctor was first called to the delivery room to perform the delivery. The edge 126 may store Dec. 30, 1964 as the date of the person of the node 106, as the date when the nurse was first called to the delivery room to assist the delivery upon admission of the of the birth mother to the hospital.

Therefore, within the data graph 100, the birth date of the person of the node 106 is differently listed as Dec. 30, 1964, Dec. 31, 1964, Jan. 1, 1965, and Jan. 2, 1964. None of these dates may be cognitively incorrect or wrong, but rather each date may represent a different cognitive understanding of what birth date is, for different purposes, including legal, tax, cultural, medical, and administrative purposes. Each node and each edge that stores the birth date of the person of the node 106 may provide contextual or cognitive information as to why or how it considers the birth date of the person of the node 106 to be the date that has stored, such as for legal, tax, cultural, medical, or administrative purposes. However, this is not necessarily the case.

The data graph 100 may have been constructed by adding information from different data stores. For example, records from a tax database may be imported, as well as records from a hospital database, an ancestral research database, a credit reporting database, and so on. When adding data to the data graph 100, via construction of new nodes or edges, the information or knowledge that the data represents is not "cleaned" or scanned to ensure that programmatically the same information is represented in the same canonical manner. That is, what one data source considers an individual's birth date as compared to what a different data source considers as an individual's birth date is not considered when adding information to the graph 100. Rather, the data may simply be added, resulting in the situation described above, in which the birth date of the person of the node 106 is not identical across different nodes and edges of the graph 100.

The data graph 100 may be a union of one or more other graphs, which may themselves be programmatic or cognitive. The union of two graphs that each store data canonically in a single canonical manner may result in a constructed graph that stores data cognitively in diverse manners if the canonical manner of one source graph is different than that of the other source graph. For example, a data graph storing birth date as the date of birth as conventionally or by custom understood in Western countries that is joined to a data graph that stores birth date by date of hospital admission for medical billing purposes results in a combined data graph that stores birth date in two different ways, underscoring that birth date may cognitively differ.

Furthermore, a given node or edge of the data graph 100 may store incorrect information for a particular data item. For example, an error in data entry may result in the birth date of the person of the node 106 being incorrect in one of the nodes or along one of the edges of the graph 100. When the data in question is added to the graph 100, there may not be a verification or check to ensure that the data is accurate for the way in which the data represents the birth date of the person of the node 106. The acknowledgment that the information represented by the graph 100 may not necessarily be 100% accurate, too, can underscore the cognitive nature of the knowledge of the graph 100, in that stored knowledge may not be accurate.

However, to the extent that the data graph 100 accurately stores multiple representations of the birth date of the person of the node 106 that differ from one another, no individual representation may be considered correct or right in an absolute sense. That the date of birth of the person of the node 106 may be different among different nodes and edges of the graph 100 does not mean that any specific date listed for this birth date is necessarily wrong. Rather, that the birth dates differ just signifies that for different purposes, for instance, the birth date of the person of the node 106 can vary.

The data graph 100 depicted in FIG. 1 is an example of a portion of a graph. A graph like the graph 100 of FIG. 1 that stores information concerning birth dates, among other knowledge, will usually include hundreds, thousands, or even millions of nodes and edges. Just six nodes and seven edges are depicted in FIG. 1 as an example of a data graph 100 that stores multiples representations of a data item—the birth date of the person of the node 106.

Furthermore, other data graphs can store information other than birth dates. The information can concern people, or may not concern people. Other information that may concern people include other types of medical, tax, legal, and birth information. Information that may not concern people can include information regarding events, places, or things. That is, the data graph 100 is just an example, and does not represent the sole type of data graph to which the techniques disclosed herein can be applied to retrieve data items from such a data graph that can store multiple representations of each data item as a cognitive approach to data storage.

Figure 2:
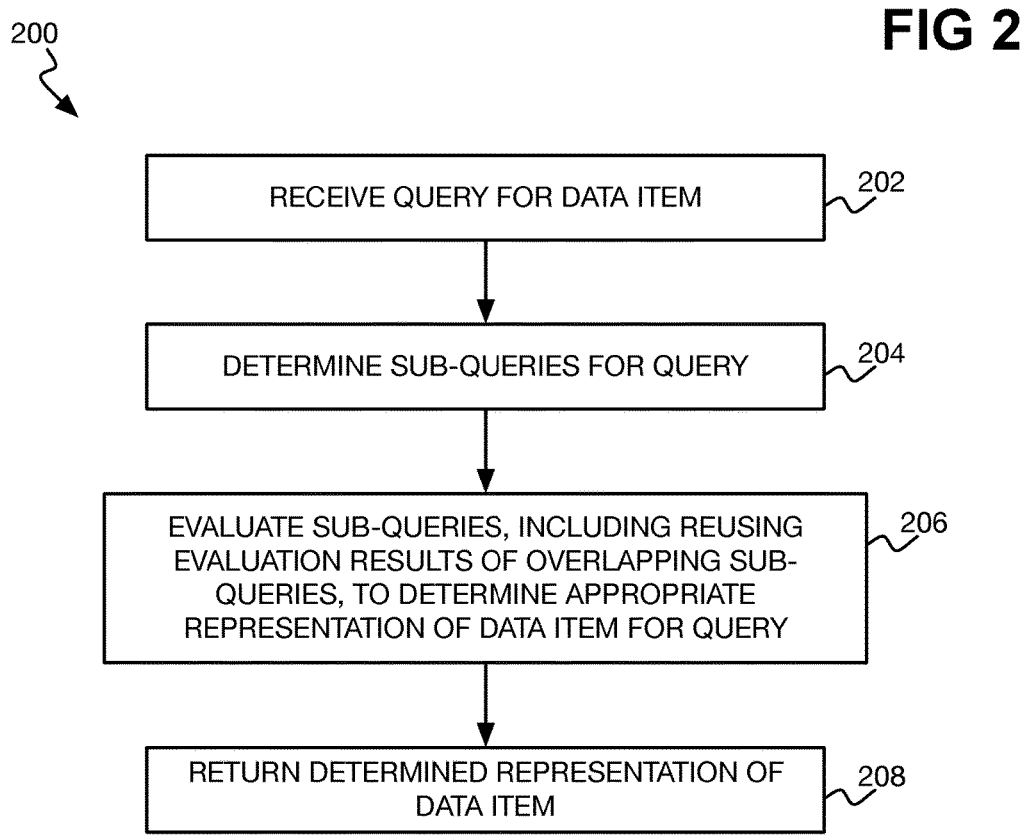
FIG. 2 is a flowchart of an example method for evaluating a query against a data graph storing multiple representations of a data item.

FIG. 2 shows an example method 200 for evaluating a query against a data graph, like the graph 100 of FIG. 1, which stores multiple representations of a data item. As noted, for a given data item having multiple representations, each representation stores knowledge or information of the data item in a different manner. That is, each representation represents the same underlying data item, but represents a different cognitive manner or way of considering the knowledge or information that the data item conveys or "is."

The method 200 is performed by a computing device that includes or that is communicatively connected to a storage device or system storing the data graph. The data graph may include terabytes, petabytes, or more of data, and as such, the storage system can be or include a multiple-storage device system such as a storage-area network (SAN). The computing device may be a server computing device, which is communicatively connected to a network to interact with the storage system, as well as with client computing devices, such as desktop or laptop computers as well as mobile computing devices like smartphones and tablet computing devices, which submit queries and to which data items responsive to the queries are returned.

The computing device thus receives a query for a data item (202). The query may be received from a client computing device. The query may be received over a network to which the computing device performing the method 200 and the client computing device are communicatively connected.

The query may be formatted in a natural language manner, such as "what is the birth date of John Smith for tax purposes"; "give me John Smith's date of birth"; "when was John Smith born"; and so on. Natural language processing therefore can be performed on the query to determine the data item of the query. In the examples, the data item in question is the birth date of John Smith, and may indicate the data item with more granularity or precision to the extent that the query includes such information, or to the extent that metadata surrounding the query can provide this information. For instance, if the query specifies, "what should I list as John Smith's birth date on his dad's will," then the natural language processing may discern that the birth date being requested is that for inheritance purposes. As another example, if the query is received from a nurse at a hospital, then the processing may discern that the birth date being requested is the date when the nurse began attending to the expectant mother upon her admission to the hospital at which the nurse was working.

The query can also be specified in a more particular manner. The different data items that a data graph stores can be known. Furthermore, the multiple representations of each data item can be known. Therefore, a query may be specified by selecting a type of data item, such as birth date, and then by selecting a particular representation of the this birth date, such as "customary," "for tax purposes," "for inheritance purposes," and so on. The query thus specifies the desired person for whom this data item is being requested, like "John Smith," as well as the particular representation of the data item that is desired. This specification of the query is more precise than a natural language specification of the query, but may be less intuitive for users, particularly less computer-savvy users.

The computing device determines sub-queries for the received query (204). Two specific implementations for determining the sub-queries for a query are described later in the detailed description. In general, each sub-query corresponds to a representation of the data item within the data graph. For instance, as to the birth date of a person within the data graph 100 of FIG. 1, such as the person of the node 106, there may be a sub-query corresponding to each of the nodes 102, 104, 106, and 108, as well as a sub-query corresponding to each of the edges 114, 116, 124, and 126, for a total of eight sub-queries. This is because each node 102, 104, 106, and 108 and each edge 114, 116, 124, and 126 stores the birth date of a person, particularly the person of the node 106.

Even though multiple node(s) or multiple edge(s) may store the same underlying understanding of the data item, each such node or edge can still have a different sub-query because it still corresponds to a different representation of the data item. For example, the birth date of the person as stored in the node 106 may reflect the same underlying understanding of what birth date means as that stored in the node 108. However, the representation of the birth date of the person as stored in the node 106 is still different than that stored in the node 108. Therefore, there can be a sub-query to retrieve the birth date of the person as stored in the node 106, and another sub-query to retrieve the birth date of the person as stored in the node 108.

The computing device evaluates the sub-queries of the query to determine an appropriate representation of the data item for the query (206). The appropriate representation of the data item for the query can be considered the representation of the data item that is correct for the query, and thus correctly answers the query insofar as the information contained in this representation is accurate. In evaluating the sub-queries, the computing device reuses the evaluation results of any sub-queries that have already been evaluated. Different approaches for reusing the evaluation results of the sub-queries when evaluating the sub-queries to are presented later in the detailed description.

Once the sub-queries have been evaluated, to select which representation of the data item to use as the appropriate representation of the data item for the query, different techniques can be employed. Some such techniques are described in the US patent application entitled, "Evaluation of query for data item having multiple representations in graph by evaluating sub-queries," filed on Sep. 28, 2016, and assigned patent application Ser. No. 15/278,639. Other such techniques are described in the US patent application entitled, "Evaluation of query for data item having multiple representations in graph on a sub-query by sub-query basis until date item has been retrieved," filed on Sep. 28, 2016, and assigned patent application Ser. No. 15/278,601.

As an example of an appropriate representation of a data item in satisfaction of a query, if the query requests the birth date of the person of the node 106 of the data graph 100 of FIG. 1 as birth date is culturally commonly understood in Western societies, the representation of the data item as stored within the nodes 106 and 108 is likely the appropriate representation to return is high. By comparison, the likelihood that the representations of the birth date as stored on edges 124 and 126 is unlikely to be the appropriate representation for this query. Whether a particular representation of the data item is appropriate for the query thus is dependent on the query itself. A sub-query that retrieves the birth date of the person for tax or inheritance purposes is unlikely to be the appropriate representation of the data item for a query requesting the birth date as commonly and culturally understood. By comparison, such a sub-query is likely to be the appropriate representation of the data item for a query that is requesting the birth date for trust and estate purposes.

It is noted that some representations of a specific data item within a data graph may not be present. For instance, in the example data graph 100 of FIG. 1, the nodes 102, 104, 106, and 108 and the edges 114, 116, 124, and 126 can store the birth date of the person of the node 106. However, this information may be missing from one or more of the nodes, and/or from one or more of the edges. The information may be missing because a data source added to the data graph 100 did not include the information, or for another reason. In such cases, the most appropriate representation that is selected for the data query may not be the best representation, because the best representation is not present within the graph 100. There is no guarantee that any given representation of a data item is actually available within the graph 100, in other words.

The computing device returns the determined representation of the data item (208). The determined representation satisfies the query that has been received. For instance, this representation can thus be the most accurate representation of the data item that fulfills the query.

Figure 3:
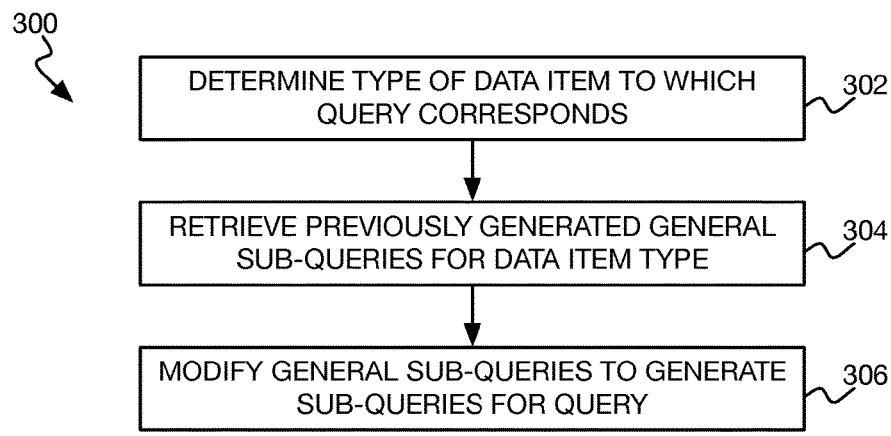
FIGS. 3 and 4 are flowcharts of different example methods for determining sub-queries for a query, which can be used as part of the method of FIG. 2.

FIG. 3 shows an example method 300 that provides one approach for determining the sub-queries for a query. The method 300 can implement part 204 of the method 200. As such, the computing device performing the method 200 can perform the method 300.

The computing device determines the type of data item to which a query corresponds (302). A data graph stores multiple representations of data items. For example, a data item can be the birth date of the person of the node 106 of the data graph 100 of FIG. 1. The birth date of this person is the data item, and the type of this data item is birth date. The birth dates of people of other nodes of the graph 100 have the same data type. That is, a data item can be considered a particular instance of a data type. Stated another way, a birth date is a type, whereas the birth date of a particular person is a data item of this type. Furthermore, the birth date has multiple representations within a data graph.

Determining the type of the data item to which the query corresponds can be achieved from the data item of the query. As noted above in relation to part 202 of the method 200, the data item of a query is determined. If a query is a natural language query, then natural language processing occurs to identify the data item of the query. The data item type can thus be determined from the data item type. For example, if natural language processing concludes that the query is for the data item "John Smith's birth date," then the data item type is simply "birth date." That is, the data item type is determinable from the data item of a query. By comparison, a query can be constructed by selecting a data item type, such as birth date, along with identifying information of the person for whom a date item of this type is desired, such as "John Smith," then the query itself identifies the data item, as well as the data item type of the query.

The computing device retrieves general sub-queries that have been previously generated for the type of the data item to which the query corresponds (304). When a data graph is created or augmented, each time a new representation of a data item is added to the graph, a corresponding general sub-query can be manually or automatically generated for the representation if no such sub-query has previously been created for a data item of the same type. For example, as to the data graph 100, the first time a node corresponding to a birth event, like the node 108, is added, which corresponds to a new representation of a birth date data item, a corresponding general sub-query can be manually or automatically generated. As another example, the first time an edge corresponding to when a doctor was called to perform delivery, like the edge 124, is added, which also corresponds to a new representation of a birth date data item, a corresponding general sub-query can be generated.

A general sub-query can identify the type of node or edge in which a corresponding representation of a data item may be located, without specifying a particular node or edge. For example, a general sub-query can specify a node for a birth event, via node type for instance, without particularly identifying the node 108. As another example, a general sub-query can specify an edge between a node of a doctor and a birth event node, via edge type for instance, without particularly identifying the node 124.

A general sub-query may further provide traversal information as to how to reach the type of node or edge in question from an entry node within a data graph. For example, if a node corresponding to a person, such as the node 106, is an entry node within a data graph, then traversal information for a birth event node may specify that the birth event node is located on an edge directly connected to the node of the person. Traversal information for an edge specifying the birth date as the date when a doctor was called to perform delivery may specify that, from the node of a person, traversal first occurs to a birth event node of that person, and then to the edge connecting the birth event node to the node of a doctor.

For each general sub-query that has been retrieved, the computing device modifies the general sub-query to generate a corresponding sub-query for the specific query in question (306). That is, each general sub-query can be modified so that it is specific to the actual data item sought in the query. For example, the query may be for a birth date data item of the person of the node 106. The general sub-query for a birth event node does not particularly specify the person of the node 106. Therefore, modifying the general sub-query so that it pertains to the person of the node 106 may include identifying the name of the person of the query. As such, the general sub-query is now specific to the query, because it identifies the name of the person for whom a data item—specifically birth date—is being sought in the query.

The method 300 thus retrieves previously generated (general) sub-queries for a query. Generating the sub-queries ahead of time can be advantageous to ensure for optimal performance in processing queries, since sub-queries do not have to be generated after a query is received. However, for data graphs that have a large number of representations of a large number of data items, performing such preprocessing to generate sub-queries prior to query receipt may be undesirable. For instance, it may not be known if certain representations or certain data items may be the subject of queries, in which case generating sub-queries ahead of time may represent unnecessary processing.

Figure 4:
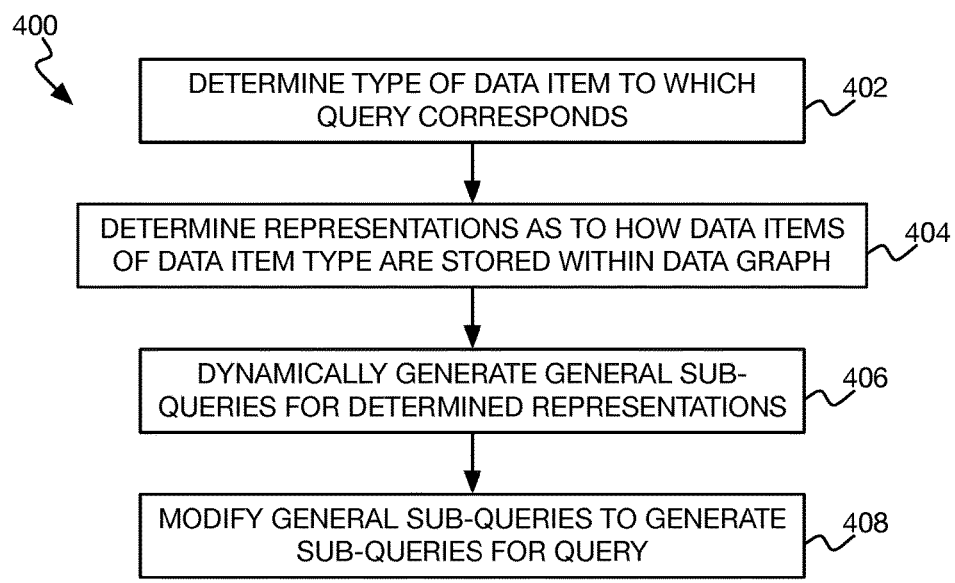

FIG. 4 shows an example method 400 that provides another approach for determining the sub-queries for a query. Like the method 300, the method 400 can implement part 204 of the method 200. The computing device performing the method 200 can thus perform the method 400.

The computing device determines the type of data item to which a query corresponds (402), as in part 302 of the method 300. The computing device further determines the representations as to how data items of this type are stored within the data graph in question (404). The different representations by which a data graph stores the knowledge or information of a data item can be recorded when a data graph is created, or when a data graph is subsequently augmented with new data.

For instance, a data graph may first be generated just with information of data including birth father and birth mother of each of a number of people, including associated birth date information. In the example of FIG. 1, this includes the information of the nodes 102, 104, and 106, and the information of the edges 114 and 116. As to the birth date of a person, such as that of the person of the node 106, there are four representations of this data item. Therefore, when the node 106 is instantiated, the representation of the birth date of the person of the node 106 is recorded, and likewise when the nodes 102 and 104, and the edges 114 and 116, are instantiated.

Continuing the example, the data graph 100 of FIG. 1 may subsequently be augmented with a data source from a hospital, which includes the information of the nodes 108, 110, and 112, and the information of the edges 124, 126, and 128. As to the birth date of a person, such as again that of the person of the node 106, there are three additional representations of this data item. Therefore, when the nodes 108, 110, and 112 are instantiated, the representations of the birth date of the person of the node 106, and likewise when the edges 124 and 126 are instantiated.

The computing device then dynamically generates the general sub-queries for the determined representations of the data item of the query (406). This process is similar to that described in relation to part 304 of the method 300, but occurs after a query has been received, as opposed to when a data graph is created or augmented. The computing device finally modifies the general sub-queries to generate the specific sub-queries for the query that has been received (408), as described above in relation to part 306 of the method 300.

The method 400 may be performed in lieu of the method 300 if performance of adding data to a data graph is prioritized over performance of query evaluation, since the method 400 generates the general sub-queries at the backend (after a query is received) instead of at the frontend (when a graph is created or augmented). The method 400 may be performed in lieu of the method 300 if there are data item representations that are unlikely to be the subject of queries, in which case generating the sub-queries at the time of graph creation or augmentation may represent unnecessary processing. Furthermore, the methods 300 and 400 can be performed in the context of the same data graph, in which some data items have representations for which general sub-queries have been created, and other data items do not.

Figure 5:
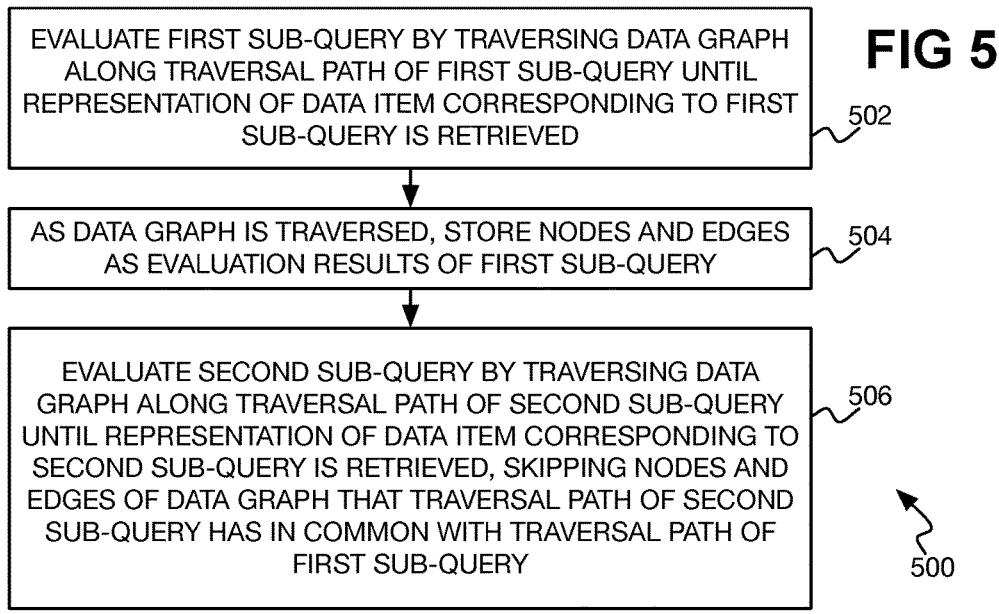
FIG. 5 is a flowchart of an example method for evaluating the sub-queries of a query, which can be used as part of the method of FIG. 2, and in which evaluation results of the sub-queries can be reused.

FIG. 5 shows an example method 500 that provides one approach for evaluating the sub-queries of a query, in which evaluation results of the sub-queries are reused. The method 500 can implement part 206 of the method 200. As such, the computing device performing the method 200 can perform the method 500. The method 500 is described in relation to a first sub-query and a second sub-query for explanatory clarity, but can be generalized to more than two sub-queries.

The computing device evaluates a first sub-query, by traversing the data graph along a traversal path of the first sub-query until the device retrieves the representation of the data item to which the first sub-query corresponds (502). The traversal path of the first sub-query can be specified as an ordered series of nodes and edges of the data graph, from an entry node of the data graph to the node or edge of the graph to which the sub-query corresponds. For example, the traversal path may be n1, e1, n2, e2, . . . , nN, where nodes are identified by n and edges are identified by e, for a sub-query that corresponds to a data representation stored in node nN of the graph. As another example, the traversal path may be n1, e1, n2, e2, n3, . . . , eN, for a sub-query that corresponds to a data representation stored in edge eN of the graph. In the ordered series of nodes and edges of the traversal path, the edge following a node is connected to the node, and similarly the node following an edge is connected to the edge. In the above examples, edge e1 is connected to node n1, node n2 is connected to edge e1, edge e2 is connected to node n2, and so on.

The traversal path of a sub-query may be determined prior to evaluation of the sub-query or may be determined dynamically as evaluation of the sub-query occurs. In the former instance, if the structure of the data graph is known— that is, which nodes are connected to which edges is known—then the traversal path may be determined before the sub-query is generated, by determining the nodes and edges that have to be traversed starting at an entry node of the data graph to reach the node or edge to which the sub-query corresponds. The data graph can have one entry node or multiple entry nodes at which traversal of the graph may start.

When the traversal path of a sub-query is determined prior to evaluation of the sub-query when the structure of the data graph is known, the traversal path through the data graph from an entry node to the node or edge to which the sub-query corresponds can be the most efficient path (or one of the most efficient paths) through the data graph to the node or edge to which the sub-query corresponds. The most efficient traversal paths through a data graph from an entry node to the node or edge to which the sub-query corresponds are those paths that involve the smallest total number of nodes and edges that have to be traversed to reach the node or edge to which the sub-query corresponds.

The traversal path of a sub-query may be determined dynamically as evaluation of the sub-query occurs. In this instance, the structure of the data graph may not be known. The traversal path may thus not be the most efficient path through the data graph from an entry node to the node or edge to which the sub-query corresponds. Rather, for a node that has multiple edges connected thereto, one of the edges may be selected randomly or in another manner to advance to another node. Therefore, the likelihood that a given path through the graph will be the most efficient to reach the node or edge to which the sub-query corresponds is low.

Traversal through a data graph along a dynamically determined traversal path of a sub-query as evaluation of the sub-query occurs can be a breadth-first search or a depth-first search for a data graph that is ordered. In a breadth-first search for an ordered data graph, each edge connected to a node at one level is consecutively selected to advance to nodes at a lower level, and then the each edge connected to each node at this lower level is selected to advance to nodes at a still lower level. This process is repeated until the node or edge to which the sub-query corresponds is reached.

In a depth-first search for an ordered data graph, one edge connected to a node at one level is selected to advance to a node at a lower level, and then one edge connected to this node at the lower level is selected to advance to a node at a still lower level. This process is repeated until a node is reached at the lowest level of the data graph or until the node or edge to which the sub-query corresponds is reached. If the node or edge to which the sub-query corresponds is not reached, another depth-first search is conducted, beginning at a different edge connected to the node at the highest level that was previously traversed and that has multiple edges connecting this node to a node at a lower level where one of these edges was not previously traversed.

Evaluation of the first sub-query thus involves traversing the data graph along a traversal path of the first sub-query from an entry node until the node or edge to which the sub-query corresponds is reached. While the computing device traverses the data graph, the device stores the nodes and edges that it traverses (504), as the evaluation results of the first sub-query. Such evaluation results can include three types of information. First, at each node or edge along the traversal path, the representation of the data item to which the node or edge corresponds can be retrieved from the data graph and stored. Second, at a node along the traversal path, which edges connect to the node can be stored; similarly, third, at an edge along the traversal path, which nodes connected to the edge can be stored.

Once the first sub-query has been evaluated, the computing device evaluates a second sub-query that overlaps the first sub-query, by traversing the data graph along a traversal path of the second sub-query until the device retrieves the representation of the data item to which the second sub-query corresponds (506). The traversal path of the second sub-query can also be specified as an ordered series of nodes and edges of the data graph, from an entry node of the data graph to the node or edge of the graph to which the sub-query corresponds. However, in evaluating the second sub-query, the computing device skips the nodes and edges of the data graph that the traversal path of the second sub-query has in common with the first traversal path of the first sub-query. The evaluation results of the first sub-query are thus reused for the nodes and edges of the data graph that the traversal path of the second sub-query has in common with the traversal path of the first sub-query.

Figure 6:
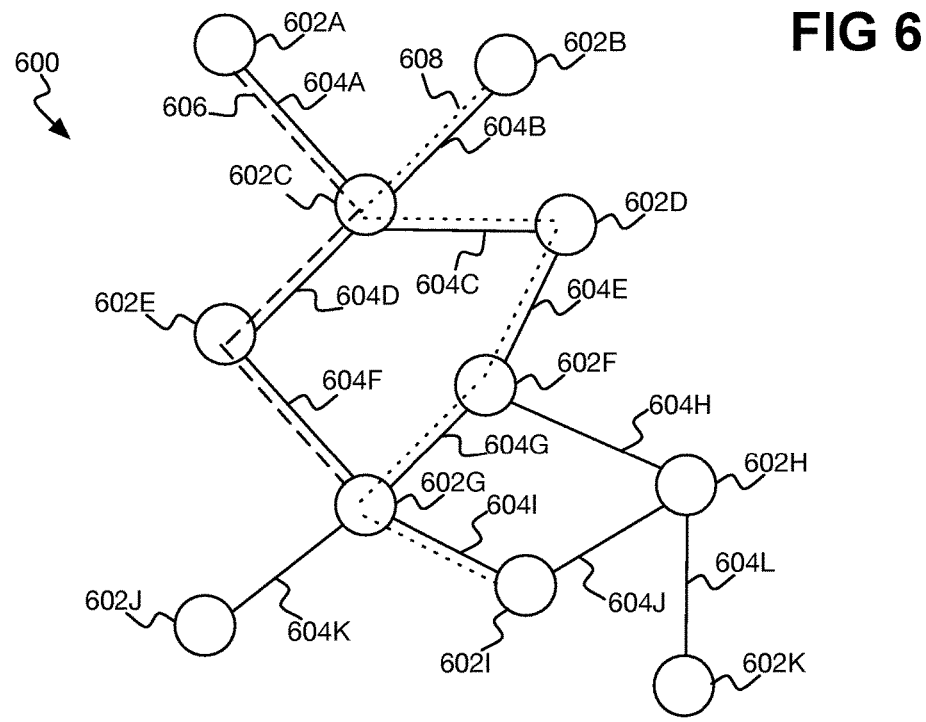
FIG. 6 is a diagram of an example data graph in relation to which example performance of the method of FIG. 5 is described.

FIG. 6 shows an example data graph 600 in relation to which performance of the method 500 is explained. The data graph 600 includes nodes 602A, 602B, 602C, 602D, 602E, 602F, 602G, 602H, 602I, 602J, and 602K, which are collectively referred to as the nodes 602. The data graph includes edges 604A, 604B, 604C, 604D, 604E, 604F, 604G, 604H, 604I, 604J, 604K, and 604L, which are collectively referred to as the edges 604. A first sub-query corresponds to the representation of a data item stored by the node 602G, and a second sub-query corresponds to the representation of the data item stored by the node 602I. The first sub-query has a traversal path 606 through the data graph 600 starting at the node 602A and ending at the node 602G, identified by a dashed line. The second sub-query has a traversal path 608 through the data graph 600 starting at the node 602B and ending at the node 602I, identified by a dotted line.

The computing device evaluates the first sub-query by traversing the data graph 600 along the traversal path 606. During evaluation of the first sub-query, at each node 602 of the traversal path 606, the computing device retrieves and stores the representation of a data item to which the node 602 corresponds, and can also store the edges 604 connected to this node 602. Similarly, during evaluation of the first sub-query, at each edge 604 of the traversal path 606, the computing device retrieves and stores the representation of a data item to which the edge 604 corresponds, and can also store the nodes 602 connected to this edge 604. This information can be stored as the evaluation results of the first sub-query.

The computing device evaluates the second sub-query by traversing the data graph 600 along the traversal path 608, but skips the nodes 602 and edges 604 that the device previously retrieved when traversing the graph 600 along the traversal path 606 of the first sub-query. Therefore, the computing device skips nodes 602C and 602G when evaluating the second sub-query. This is because the nodes 602C and 602G are common to both the traversal paths 606 and 608 of the first and second sub-queries.

Figure 7:
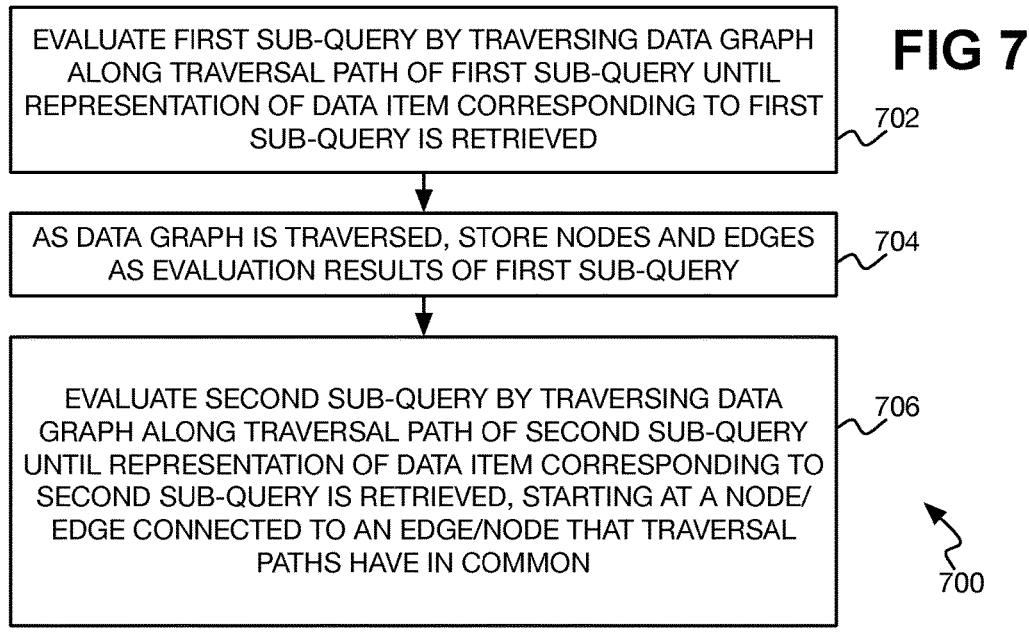
FIG. 7 is a flowchart of another example method for evaluating the sub-queries of a query, which is consistent with that of FIG. 5 can be used as part of the method of FIG. 2, and in which evaluation results of the sub-queries can be reused.

FIG. 7 shows an example method 700 that provides another appropriate for evaluating the sub-queries of a query, in which evaluation results of the sub-queries are reused. The method 700 can implement part 206 of the method 200. As such, the computing device performing the method 200 can perform the method 700. The method 700 is also described in relation to a first sub-query and a second sub-query for explanatory clarity, but can be generalized to more than two sub-queries.

The computing device evaluates a first sub-query, by traversing the data graph along a traversal path of the first sub-query until the device retrieves a representation of the data item to which the first sub-query corresponds (702). Part 702 can be performed in the same manner as part 502 of the method 500 described above. Thus, the first sub-query has a traversal path from an entry node of the data graph to a node or edge of the graph storing the representation of the data item to which the first sub-query corresponds. While the computing device traverses the data graph, the device stores the nodes and edges that it traverses (704), as the evaluation results of the first sub-query. Part 704 can be performed in the same manner as part 504 of the method 500 described above.

Once the first sub-query has been evaluated, the computing device evaluates a second sub-query that overlaps the first sub-query, by traversing the data graph along a traversal path of the second sub-query until the device retrieves the representation of the data item to which the second sub-query corresponds (706). In evaluating the second sub-query, rather than starting at the entry node of the data graph specified within the traversal path of the second sub-query, the computing device starts at the node (or edge) connected to an edge (or node) that the traversal paths of the first and second sub-queries have in common. That is, the nodes and edges of the data graph from the entry node of the graph through the last or lowest-level edge or node that the traversal path of the second sub-query has in common with the traversal path of the first sub-query are skipped.

The method 700 can be considered as a special case of the method 500. In the method 500, the nodes and edges of the traversal path of the second sub-query that are skipped may not be adjacent to one another. For instance, if the traversal path of the second sub-query is specified as the ordered series A-a-B-b-C-c-D-d, where upper-case letters denote nodes and lower-case letters denote edges, nodes B and D may be skipped, but these nodes are not adjacent to one another within the traversal path. As another example, in FIG. 6, the nodes 602C and 602G are skipped, but the nodes 602D and 602F between the nodes 602C and 602G within the traversal path 608 are not skipped.

By comparison, in the method 700, the nodes and edges of the traversal path of the second sub-query that are skipped are adjacent to one another. The skipped nodes and edges can include the first node through the last or lowest-level edge or node that the traversal path of the second sub-query has in common with the traversal path of the first sub-query. The method 700 is thus a special case, such as in the context of a data graph that is a tree data graph. In a tree data graph, each node has just one parent node. Therefore, the traversal paths of the first and second sub-queries, when the sub-queries overlap, can have common nodes and edges from the entry (or root) node of the graph, consecutively through a last common node or edge of the graph.

Figure 8:
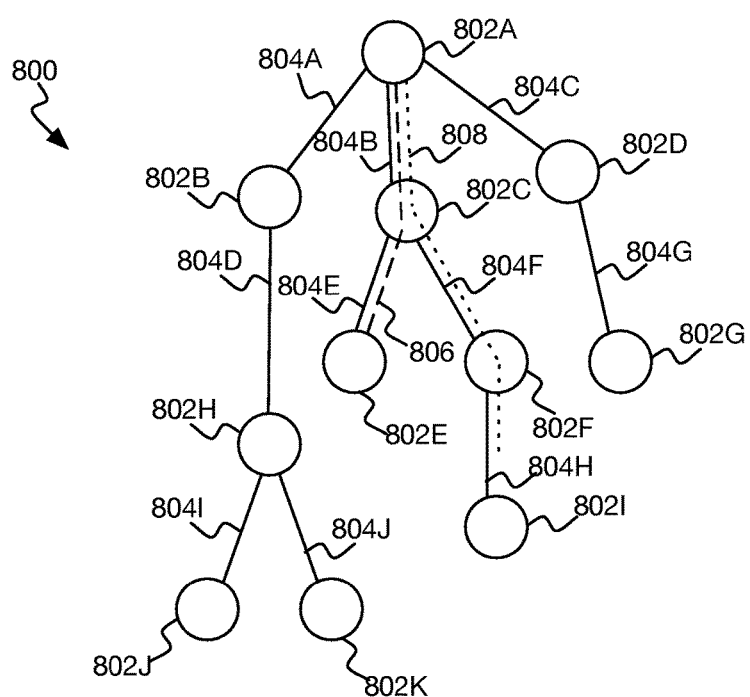
FIG. 8 is a diagram of an example data graph in relation to which example performance of the method of FIG. 7 is described.

FIG. 8 shows an example data graph 800 in relation to which performance of the method 700 is explained. The data graph 800 is a tree data graph. The data graph includes an entry (or root) node 802A have children nodes 802B, 802C, and 802D, to which the node 802A is connected via edges 804A, 804B, and 804C, respectively. The node 802B has a child node 802H to which the node 802A is connected via an edge 804D, and the node 802H has children nodes 802J and 802K to which the node 802H is connected via edges 804I and 804J, respectively. The node 802C has a children nodes 802E and 802F to which the node 802C is connected via edges 804E and 804F, respectively, and the node 802F has a child node 802I to which the node 802F is connected via an edge 804H. The node 802D has a child node 802G to which the node 802D is connected via an edge 804G.

A first sub-query corresponds to the representation of a data item stored by the node 802E. The first sub-query has a traversal path 806 through the data graph 800 starting at the node 802A and ending at the node 802E, identified by a dashed line. A second sub-query corresponds to the representation of the data item stored by the edge 804H. The second sub-query has a traversal path 808 through the data graph starting at the node 802A and ending at the edge 804H, identified by a dotted line.

The computing device evaluates the first sub-query by traversing the data graph 800 along the traversal path 806. During this evaluation, at each node 802 of the traversal path 806, the computing device retrieves and stores the representation of a data item to which the node 802 corresponds, and can also store the edges 804 connected to this node 802. Similarly, during evaluation of the first sub-query, at each edge 804 of the traversal path 806, the computing device retrieves and stores the representation of a data item to which the edge 804 corresponds, and can also store the nodes 802 connected to this edge 804. This information can be stored as the evaluation results of the first sub-query.

The computing device evaluates the second sub-query by traversing the data graph 800 along the traversal path 808, but starting at the edge 804F instead of at the node 802A. This is because the traversal paths 606 and 608 have the node 802A, the edge 804B, and the node 802C in common. The node 802A, the edge 804B, and the node 802C are consecutive (and adjacent) to one another within each of the traversal paths 606 and 608, specifically at the beginning of each path 606 and 608. Stated another way, a sub-path of the node 802A, the edge 804B, and the node 802C is a first portion of each of the traversal paths 606 and 608. Therefore, the computing device just has to traverse the edge 804F, the node 802F, and the edge 804H to evaluate the second sub-query.

Figure 9:
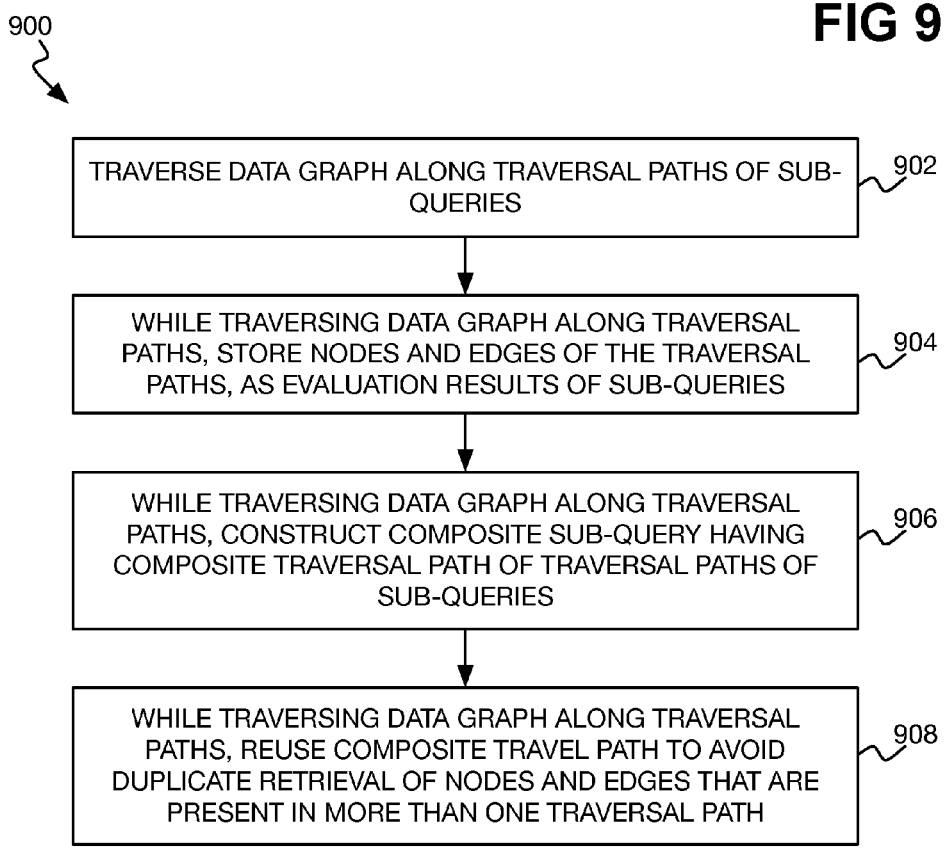
FIG. 9 is a flowchart of an example method for evaluating the sub-queries of a query, which can be used as part of the method of FIG. 2, and in which evaluation results of the sub-queries are reused by constructing a composite sub-query.

FIG. 9 shows an example method 900 that provides one approach for evaluating the sub-queries of a query, in which evaluation results of the sub-queries are reused by constructing a composite sub-query. The method 900 can implement part 206 of the method 200. As such, the computing device performing the method 200 can perform the method 900.

The computing device traverses the data graph along the traversal paths of the sub-queries (902). This can be performed on a sub-query by sub-query basis, for instance. While traversing the data graph along the traversal paths of the sub-queries (i.e., while traversing the data graph along the traversal path of a current sub-query), the computing device performs the following.

The computing device stores the nodes and edges of the traversal paths, as the evaluation results of the sub-queries (904). Part 904 can be performed in the same manner in which part 504 of the method 500 is performed, as described above. The computing device constructs a composite sub-query of the sub-queries as the device traverses the traversal paths of the sub-queries (i.e., as the device traverses the traversal path of a current sub-query) (906). That is, the computing device constructs a composite traversal path having nodes and edges that are present in the traversal path of at least one sub-query.

As such, the computing device can reuse the composite travel path to avoid duplicate retrieval of nodes and edges that are present in the traversal paths of more than one sub-query (908). When traversing the data graph along a traversal path of a current sub-query, any edge or node of the traversal path that is already present in the composite traversal path is thus skipped. In this way, as each sub-query is evaluated, the composite sub-query increases in size in that its composite traversal path increases in size to include the nodes and edges present in the currently evaluated sub-query that are not present in any previously evaluated sub-query. As the computing device executes more sub-queries, the likelihood that a given node or edge of the traversal path of a current sub-query has already been traversed in the traversal path of an already evaluated sub-query (and thus present in the composite travel path of the composite sub-query) increases.

Figure 10:
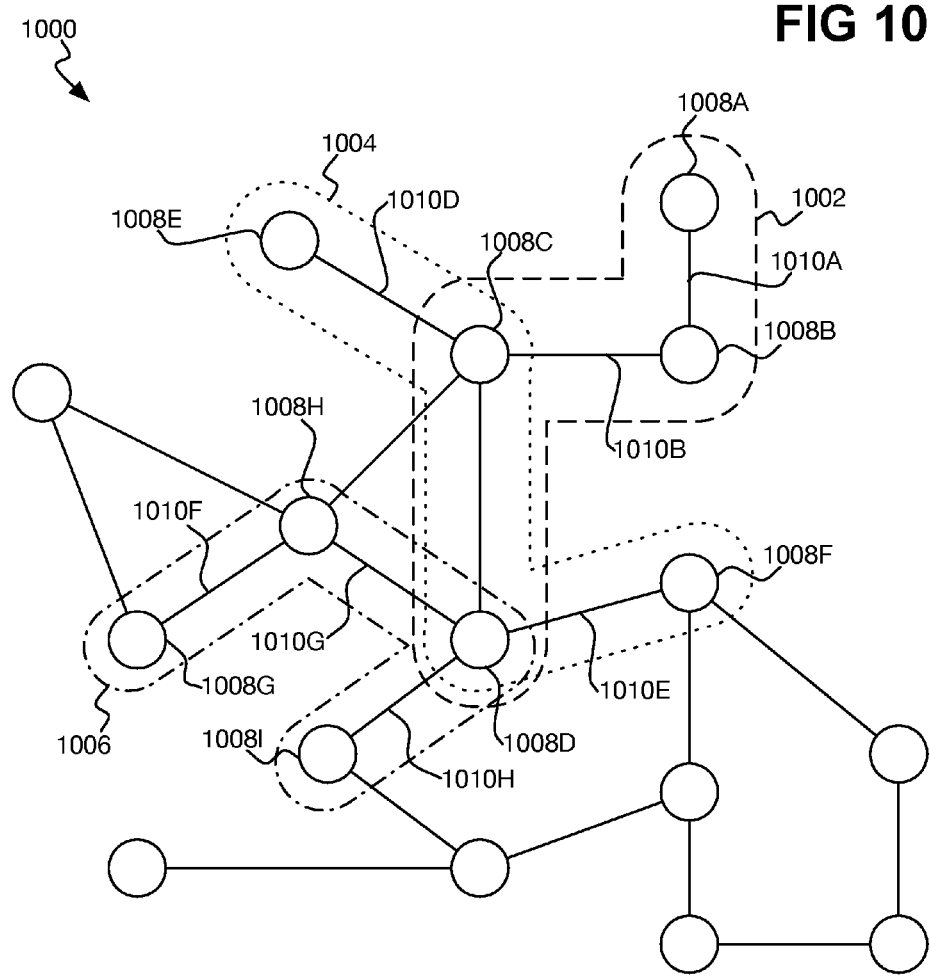
FIG. 10 is a diagram of an example data graph in relation to which example performance of the method of FIG. 9 is described.

FIG. 10 shows an example data graph 1000 by which performance of the method 900 is explained. First, second, and third sub-queries are depicted in FIG. 10 via their traversal paths 1002, 1004, and 1006, respectively, having different types of lines encompassing the nodes and edges of the data graph 100 that they include. For example purposes, it is assumed that the first sub-query is evaluated first, then the second sub-query, and finally the third sub-query.

When the first sub-query having the traversal path 1002 is evaluated, the composite traversal path of the composite sub-query is empty, because no prior sub-query has yet been evaluated. Therefore, nodes 1008A, 1008B, 1008C, and 1008D and edges 1010A, 1010B, 1010C, and 1010D of the traversal path 1002 are retrieved from the data graph 1000 and added to the composite traversal path. No nodes or edges of the data graph 1000 can be reused, because no sub-query was evaluated prior to the first sub-query being evaluated.

When the second sub-query having the traversal path 1004 is evaluated, nodes 1008E and 1008F and edges 1010D and 1010E still have to be retrieved from the data graph 1000, and are then added to the composite traversal path. However, the nodes 1008C and 1008D and the edge 1010C do not have to be retrieved from the graph 1000, but rather can be reused from the composite traversal path. Therefore, once the second sub-query has been evaluated, the composite traversal path includes the nodes and edges of the data graph 1000 that are present in the traversal path 1002 of the first sub-query, the traversal path 1004 of the second sub-query, or in both the traversal paths 1002 and 1004.

When the third sub-query having the traversal path 1006 is evaluated, nodes 1008G, 1008H, and 1008I and edges 1010F, 1010G, and 1010H still have to be retrieved from the data graph 1000, and can then be added to the composite traversal path. However, the node 1008D does not have to be retrieved from the graph 1000, but rather can be reused from the composite traversal path. If a fourth sub-query of the query were to be evaluated, the composite traversal of the composite sub-query that would be reused would thus include the nodes and edges of the graph 1000 that are present in one or more of the traversal paths 1002, 1004, and 1006 of the first, second, and third sub-queries.

Figure 11:
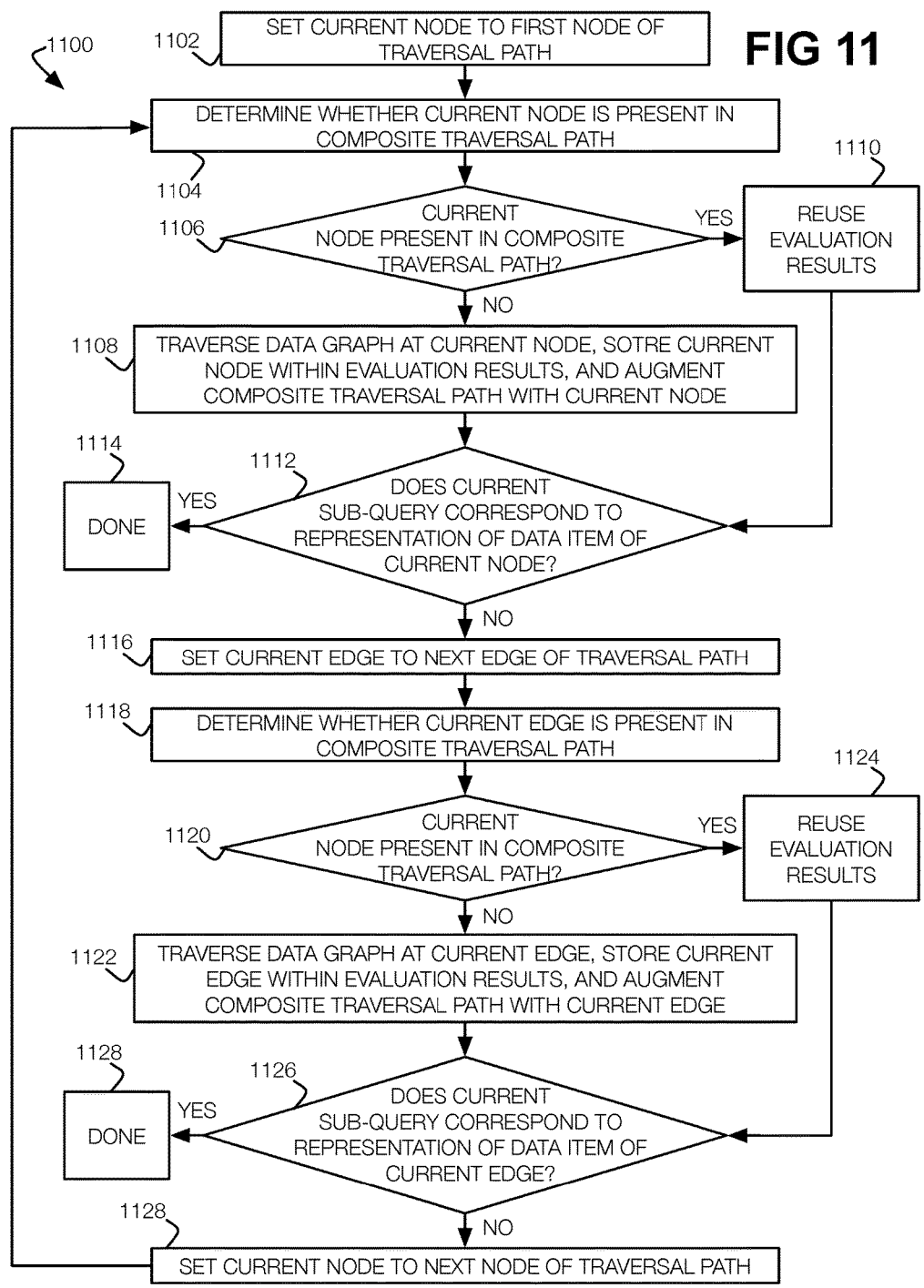
FIG. 11 is a flowchart of an example method for evaluating the sub-queries of a query, which is one approach for implementing the method of FIG. 9 and can be used as part of the method of FIG. 2, and in which evaluation results of the sub-queries are reused by constructing a composite sub-query.

FIG. 11 shows an example method 1100 that provides one another for evaluating the sub-queries of a query, in which evaluation results of the sub-queries are reused by constructing a composite sub-query. The method 900 can implement part 206 of the method 200, such that the computing device that performs the method 200 can perform the method 900. The method 900 is described in relation to a current sub-query, and is repeated on a sub-query by sub-query basis for the sub-queries of the query.

What is referred to as a current node is set to the first node of the traversal path of the current sub-query (1102). The computing device determines whether the current node is present in the composite traversal path of the composite sub-query (1104). When the first sub-query of the query is being evaluated via performance of the method 1100, this composite traversal path is empty until it has nodes and edges added thereto. If the current node is not present in the composite traversal path (1106), then the computing device traverses the data graph at the current node (1108). The current node, such as the representation of a data item stored therein as well as the identification of the node within the data graph, is retrieved from the data graph and stored within the evaluation results of the sub-queries, and the composite traversal path augmented with the current node. In this way, the composite traversal path is constructed on a node-by-node basis.

However, if the current node is present in the composite traversal path (1106), then the computing device can just reuse the evaluation results of the sub-queries (1110). The computing device does not have to traverse the data graph at the current node, and does not have to retrieve the current node from the data graph. Rather, the current node is retrieved from the evaluation results.

Evaluation of the current sub-query is therefore performed more quickly. This is particularly the case if the data graph is stored on a storage device to which the computing device is communicatively connected over a network. No network latency is incurred, nor is any storage device access latency. The latter latency may be significant if a number of other computing devices are also evaluating their own queries and sub-queries, which can potentially overburden the storage device.

If the current sub-query corresponds to the representation of the data item of the current node that was retrieved from the data graph in part 1108 or reused from the evaluation results in part 1110 (1112), the computing device is finished evaluating the current sub-query. If not, however, the computing device sets the current edge to the next edge of the traversal path of the current sub-query (1116), which can be the first edge of the traversal path if the current node is the first node of the path. The computing device determines whether the current edge is present in the composite traversal path of the composite sub-query (1118).

If the current edge is not present in the composite traversal path (1120), then the computing device traverses the data graph at the current edge (1122). The current edge, such as the representation of a data item stored therein as well as the identification of the edge within the data graph, is retrieved from the graph and stored within the evaluation results of the sub-queries, and the composite travel path augmented with the current node. In this way, the composite traversal path is also constructed on an edge-by-edge basis.

However, if the current edge is present in the composite traversal path (1120), then the computing device can reuse the evaluation results of the sub-queries (1124). The computing device does not have to traverse the data graph at the current edge, and does not have to retrieve the current edge from the graph. Rather, the current edge is retrieved from the evaluation results.

If the current sub-query corresponds to the representation of the data item of the current edge that was retrieved from the data graph in part 1122 or reused from the evaluation results in part 1124 (1126), then the computing device is finished evaluating the current sub-query. If not, then the computing device sets the current node to the next edge of the traversal path of the current sub-query (1130). The method 1100 is then repeated at part 1104.

Figure 12:
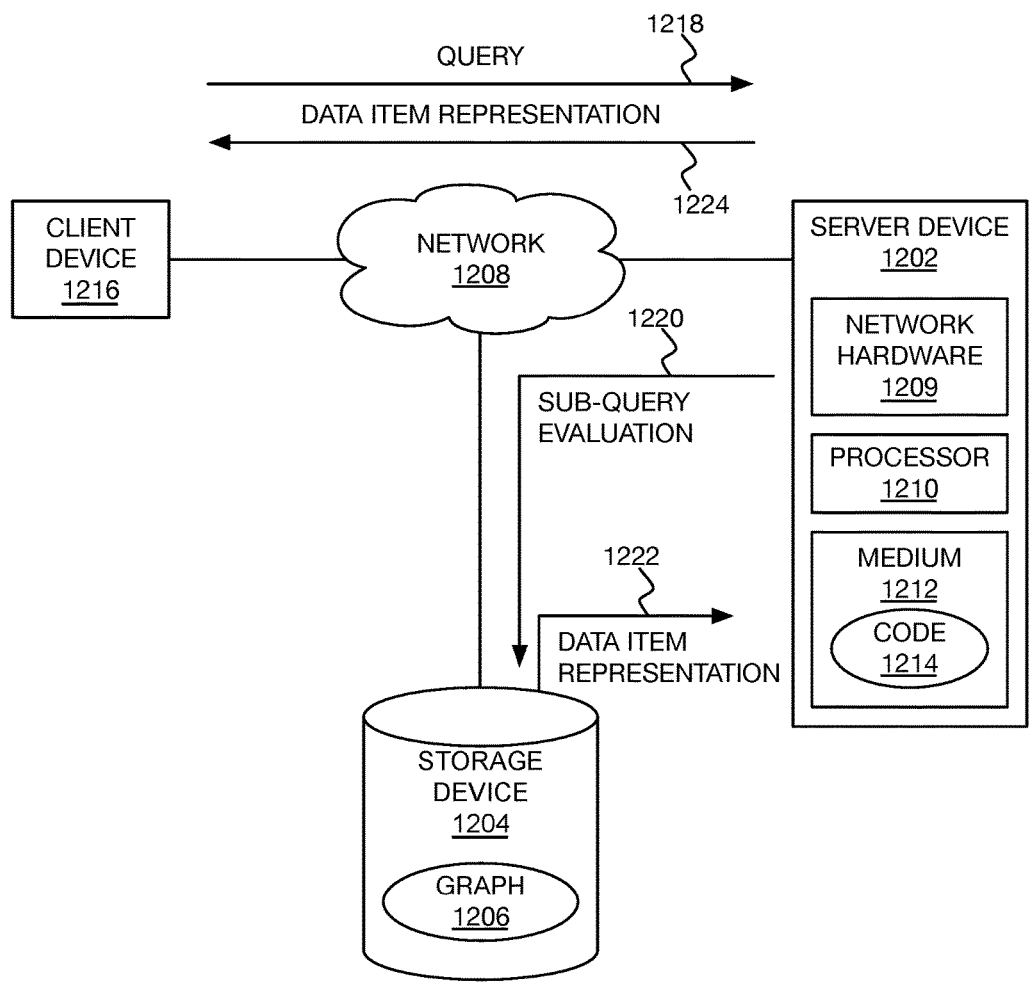
FIG. 12 is a diagram of an example system.

FIG. 12 shows an example system 1200. The system 1200 can include a server computing device 1202 and a storage device 1204 that stores a data graph 1206, such as the data graph 100 that has been described. As depicted in the example of FIG. 12, the server computing device 1202 and the storage device 1204 are communicatively connected to on another over a network 1208. However, in another implementation, the storage device 1204 may be part of or directly connected to the server computing device 1202.

The server computing device 1202 includes network hardware 1209, a processor 1210, and a computer-readable medium 1212 that stores computer-executable code 1214. The network hardware 1209 can include an Ethernet adapter, or another type of network adapter. The network hardware 1209 permits the server computing device 1202 to communicatively connect to the network 1208, to which the storage device 1204 is also communicatively connected in the example of FIG. 12. The computer-readable medium 1212 may be or include a volatile or non-volatile medium. The processor 1210 executes the code 1214 from the medium to perform any of the methods that have been described.

The storage device 1204 can be or include a non-volatile storage device, and may be part of a SAN or another type of storage system or sub-system. The network 1208 may be or include a local-area network (LAN), a wide-area network (WAN), an intranet, an extranet, the Internet, as well as other types of networks. A client computing device 1216 can also be communicatively connected to the network 1208. The client computing device 1216 may be a general-purpose computer, such as a desktop or laptop computer, and/or a mobile computing device, such as a smartphone, a tablet computing device, and so on.

In operation, the server computing device 1202 receives a query for a data item of the data graph 1206 from the client computing device 1216, per arrow 1218. The server computing device 1202 responsively determines sub-queries for this query, and evaluates one or more sub-queries against the data graph 1206 of the storage device 1204, per arrow 1220. In response, the server computing device 1202 can receive a representation of the data item appropriate to the query, per arrow 1222. The server computing device 1202 then returns this representation of the data item to the client computing device 1216, per arrow 1224. The data and processing flow represented by the arrows 1218, 1220, 1222, and 1224 thus represent the data and processing that flows and occurs among the devices 1202, 1204, and 1206 over the network 1208 in realizing the method 200 of FIG. 2.

The techniques that have been described herein provide for a manner by which a query for a data item that has multiple representations in a data graph to be evaluated. Specifically, evaluation of the sub-queries of a query can be more quickly evaluated. This is achieved by reusing the evaluation results of already evaluated sub-queries of the query when evaluating a current sub-query. If a current node or edge of a traversal path of a current sub-query was previously retrieved from the data graph when previously evaluating a different sub-query of the query, it does not have to be retrieved from the graph again.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

I claim:

1. A method comprising:
receiving, by a computing device, a query for retrieving a data item of a data graph, the data graph storing a plurality of representations of the data item, each representation of the data item storing knowledge represented by the data item in a different manner, wherein the data graph comprises a plurality of nodes interconnected via a plurality of edges, and wherein each representation of the data item corresponds to a different node or edge of the data graph;

determining, by the computing device, a plurality of sub-queries for the query, each sub-query corresponding to a different representation by which the data graph stores the data item;

evaluating, by the computing device, the sub-queries of the query to determine an appropriate representation of the data item in fulfillment of the query, including reusing evaluation results of the sub-queries that overlap one another, wherein evaluating the sub-queries, including reusing the evaluation results of the sub-queries that overlap one another, comprises, for a current sub-query:

for a current node of a traversal path through the data graph corresponding to the current sub-query, determining whether the current node is present in a composite traversal path corresponding to a composite sub-query;

in response to determining that the current node is present in the composite traversal path, reusing the evaluation results of the sub-queries instead of traversing the data graph at the current node; and in response to determining that the current node is absent from the composite traversal path, traversing the data graph at the current node, storing the current node within the evaluation results of the sub-queries, and augmenting the composite traversal path with the current node.

2. The method of claim 1, further comprising:
returning, by the computing device, the appropriate representation of the item to fulfill the query.

3. The method of claim 1, wherein evaluating the sub-queries, including reusing the evaluation results of the sub-queries that overlap one another, comprises, for a first sub-query and a second sub-query that overlap one another:

evaluating the first sub-query by traversing the data graph along a first traversal path corresponding to the first sub-query, starting at an entry node of the data graph, and ending at the node or edge to which the representation of the first sub-query corresponds;

while traversing the data graph along the first traversal path, storing the nodes and edges of the data graph of the first traversal path, as the evaluation results of the first sub-query; and evaluating the second sub-query by traversing the data graph along a second traversal path corresponding to the second sub-query, starting at the entry node of the data graph, ending at the node or edge to which the representation of the second sub-query corresponds, and skipping the nodes and edges of the data graph that the second traversal path has in common with the first traversal path.

4. The method of claim 3, wherein skipping the nodes and edges of the data graph that the second traversal path has in common with the first traversal path comprises:

reusing the evaluation results of the first sub-query for the nodes and edges of the data graph that the second traversal path has in common with the first traversal path in lieu of traversing the data graph along the nodes and edges of the data graph that the second traversal path has in common with the first traversal path.

5. The method of claim 1, wherein evaluating the sub-queries, including reusing the evaluation results of the sub-queries that overlap one another, comprises, for a first sub-query and a second sub-query that overlap one another:

evaluating the first sub-query by traversing the data graph along a first traversal path corresponding to the first sub-query, starting at an entry node of the data graph, and ending at the node or edge to which the representation of the first sub-query corresponds;

while traversing the data graph along the first traversal path, storing the nodes and edges of the data graph of the first traversal path, as the evaluation results of the first sub-query; and evaluating the second sub-query by traversing the data graph along a second traversal path corresponding to the second sub-query, starting at a node or edge of the data graph connected to an edge or node that the first traversal path has in common with the second traversal path, and ending at the node or edge to which the representation of the second sub-query corresponds.

6. The method of claim 5, wherein starting at the node or edge of the data graph connected to the edge or node that the first traversal path has in common with the second traversal path causes evaluation of the second sub-query to skip the nodes and edges of the data graph from the entry node to the edge or node that the first traversal path has in common with the second traversal path.

7. The method of claim 1, wherein evaluating the sub-queries, including reusing the evaluation results of the sub-queries that overlap one another, comprises:
traversing the data graph along traversal paths corresponding to the sub-queries;
while traversing the data graph along the traversal paths, storing the nodes and edges of the data graph of the traversal paths, as the evaluation results of the sub-queries;
while traversing the data graph along the traversal paths, constructing a composite sub-query having a composite traversal path of the traversal paths of the sub-queries, from the evaluation results of the sub-queries;
while traversing the data graph along the traversal paths, reusing the composite traversal path to avoid duplicate retrieval of the nodes and edges that are present in more than one of the traversal paths.

8. The method of claim 7, wherein traversing the data graph along the traversal paths corresponding to the sub-queries comprises skipping the edges and nodes of the data graph that are present in the composite traversal path.

9. The method of claim 1, wherein evaluating the sub-queries, including reusing the evaluation results of the sub-queries that overlap one another, further comprises, for the current sub-query:
for a current edge of the traversal path connected to the current node, determining whether the current edge is present in the composite traversal path;
in response to determining that the current edge is present in the composite traversal path, reusing the evaluation results of the sub-queries instead of traversing the data graph at the current edge; and
in response to determining that the current edge is absent from the composite traversal path, traversing the data graph at the current edge, storing the current edge within the evaluation results of the sub-queries, and augmenting the composite traversal path with the current edge.

10. A computer program product comprising a computer-readable storage medium having program instructions embodied therewith, wherein the computer-readable storage medium is not a transitory signal per se, the program instructions executed by a computing device to:

determine a plurality of sub-queries for a query, the query for retrieving a data item of a data graph, the data graph storing a plurality of representations of the data item, each representation of the data item storing knowledge represented by the data item in a different way, each sub-query corresponding to a different representation by which the data graph stores the data item; and evaluate the sub-queries to determine an appropriate representation of the data item in fulfillment of the query, wherein the computing device is to evaluate the sub-queries by, for a current sub-query:
for a current node of a traversal path through the data graph corresponding to the current sub-query, determining whether the current node is present in a composite traversal path corresponding to a composite sub-query;
in response to determining that the current node is present in the composite traversal path, reusing the evaluation results of the sub-queries instead of traversing the data graph at the current node;
in response to determining that the current node is absent from the composite traversal path, traversing the data graph at the current node, storing the current node within the evaluation results of the sub-queries, and augmenting the composite traversal path with the current node;
for a current edge of the traversal path connected to the current node, determining whether the current edge is present in the composite traversal path;
in response to determining that the current edge is present in the composite traversal path, reusing the evaluation results of the sub-queries instead of traversing the data graph at the current edge; and
in response to determining that the current edge is absent from the composite traversal path, traversing the data graph at the current edge, storing the current edge within the evaluation results of the sub-queries, and augmenting the composite traversal path with the current edge.

11. The computer program product of claim 10, wherein the data graph comprises a plurality of nodes interconnected via a plurality of edges,
wherein each representation of the data item corresponds to a different node or edge of the data graph,
and wherein the computing device is to evaluate the sub-queries.

12. The computer program product of claim 10, wherein the computing device is to evaluate the sub-queries by, for a first sub-query and a second sub-query that overlap one another:
evaluating the first sub-query by traversing the data graph along a first traversal path corresponding to the first sub-query, starting at an entry node of the data graph, and ending at the node or edge to which the representation of the first sub-query corresponds;
while traversing the data graph along the first traversal path, storing the nodes and edges of the data graph of the first traversal path, as the evaluation results of the first sub-query; and
evaluating the second sub-query by traversing the data graph along a second traversal path corresponding to the second sub-query, starting at the entry node of the data graph, ending at the node or edge to which the representation of the second sub-query corresponds, and skipping the nodes and edges of the data graph that the second traversal path has in common with the first traversal path.

13. The computer program product of claim 10, wherein the computing device is to evaluate the sub-queries by:
- traversing the data graph along traversal paths corresponding to the sub-queries;
- while traversing the data graph along the traversal paths, storing the nodes and edges of the data graph of the traversal paths, as the evaluation results of the sub-queries;
- while traversing the data graph along the traversal paths, constructing a composite sub-query having a composite traversal path of the traversal paths of the sub-queries, from the evaluation results of the sub-queries;
- while traversing the data graph along the traversal paths, reusing the composite traversal path to avoid duplicate retrieval of the nodes and edges that are present in more than one of the traversal paths.

14. A system comprising:
- network hardware to communicatively connect to a network over which a query for retrieving a data item of a data graph is received;
- a storage device to store the data graph, the data graph having a plurality of nodes interconnected by a plurality of edges, the data graph including a plurality of representations of the data item, each representation representing the data item in a different way, each representation corresponding to a different node or edge of the data graph; and
- logic comprising hardware, to:
  - select an appropriate representation of the data item in satisfaction of the query by evaluating a plurality of sub-queries for the query, each sub-query corresponding to a different representation by which the data graph stores the data item,
- wherein the logic is to evaluate the sub-queries by, for a current sub-query:
  - for a current node of a traversal path through the data graph corresponding to the current sub-query, determining whether the current node is present in a composite traversal path corresponding to a composite sub-query;
  - in response to determining that the current node is present in the composite traversal path, reusing the evaluation results of the sub-queries instead of traversing the data graph at the current node;
  - in response to determining that the current node is absent from the composite traversal path, traversing the data graph at the current node, storing the current node within the evaluation results of the sub-queries, and augmenting the composite traversal path with the current node;
  - for a current edge of the traversal path connected to the current node, determining whether the current edge is present in the composite traversal path;
  - in response to determining that the current edge is present in the composite traversal path, reusing the evaluation results of the sub-queries instead of traversing the data graph at the current edge; and
  - in response to determining that the current edge is absent from the composite traversal path, traversing the data graph at the current edge, storing the current edge within the evaluation results of the sub-queries, and augmenting the composite traversal path with the current edge.

15. The system of claim 14, wherein the logic is to evaluate the sub-queries by, for a first sub-query and a second sub-query that overlap one another:
- evaluating the first sub-query by traversing the data graph along a first traversal path corresponding to the first sub-query, starting at an entry node of the data graph, and ending at the node or edge to which the representation of the first sub-query corresponds;
- while traversing the data graph along the first traversal path, storing the nodes and edges of the data graph of the first traversal path, as the evaluation results of the first sub-query; and
- evaluating the second sub-query by traversing the data graph along a second traversal path corresponding to the second sub-query, starting at the entry node of the data graph, ending at the node or edge to which the representation of the second sub-query corresponds, and skipping the nodes and edges of the data graph that the second traversal path has in common with the first traversal path.

16. The system of claim 14, wherein the logic is to evaluate the sub-queries by:
- traversing the data graph along traversal paths corresponding to the sub-queries;
- while traversing the data graph along the traversal paths, storing the nodes and edges of the data graph of the traversal paths, as the evaluation results of the sub-queries;
- while traversing the data graph along the traversal paths, constructing a composite sub-query having a composite traversal path of the traversal paths of the sub-queries, from the evaluation results of the sub-queries;
- while traversing the data graph along the traversal paths, reusing the composite traversal path to avoid duplicate retrieval of the nodes and edges that are present in more than one of the traversal paths.

* * * * *